United States Patent
Andersson

(10) Patent No.: US 9,283,839 B2
(45) Date of Patent: Mar. 15, 2016

(54) FITTING ARRANGEMENT FOR FITTING A DRIVE PACKAGE FOR A VEHICLE

(71) Applicant: SCANIA CV AB, Södertälje (SE)

(72) Inventor: Erik Andersson, Järna (SE)

(73) Assignee: SCANIA CV AB (SE)

( * ) Notice: Subject to any disclaimer, the term of this patent is extended or adjusted under 35 U.S.C. 154(b) by 0 days.

(21) Appl. No.: 14/386,130

(22) PCT Filed: Mar. 22, 2013

(86) PCT No.: PCT/SE2013/050320
§ 371 (c)(1),
(2) Date: Sep. 18, 2014

(87) PCT Pub. No.: WO2013/151485
PCT Pub. Date: Oct. 10, 2013

(65) Prior Publication Data
US 2015/0060182 A1    Mar. 5, 2015

(30) Foreign Application Priority Data
Apr. 2, 2012 (SE) ......... 1250329

(51) Int. Cl.
*B62D 25/08* (2006.01)
*B60K 5/12* (2006.01)
(Continued)

(52) U.S. Cl.
CPC ......... *B60K 5/1208* (2013.01); *B62D 21/09* (2013.01); *F16B 43/025* (2013.01); *F16B 5/02* (2013.01)

(58) Field of Classification Search
CPC ......... F16B 43/025; F16B 5/02; F16B 5/025; B60K 5/1208; B62D 21/09; B62D 27/065
USPC ................. 180/299, 292; 280/784
See application file for complete search history.

(56) References Cited

U.S. PATENT DOCUMENTS 1,314,673 A * 9/1919 Krafve ............ B60K 5/12
248/659
1,373,093 A * 3/1921 Pearson ............ B60K 5/12
248/659
(Continued)

FOREIGN PATENT DOCUMENTS

DE    40 17 885 A1    12/1990
FR    2 781 006 A1    1/2000
(Continued)

OTHER PUBLICATIONS

International Search Report dated Jul. 17, 2013 issued in corresponding International patent application No. PCT/SE2013/050320.
(Continued)

*Primary Examiner* — Brodie Follman
*Assistant Examiner* — Brian Cassidy
(74) *Attorney, Agent, or Firm* — Ostrolenk Faber LLP

(57) ABSTRACT

A fitting arrangement for fitting a drive package (1) for a vehicle, the arrangement includes a supporting element (2) to be mounted on the drive package (1). The supporting element (2) has an end element (6), which cooperates with the vehicle's frame (4) to support the drive package (1). The end element abuts upon a cooperating bearing element which is suspended relative to the frame (4). At least one screw (10) cooperates with the end element (6), to fix the supporting element (2) to the vehicle's frame (4) via the bearing element (8). A washer (12) cooperates with the screw (10) to fix the supporting element (2) to the frame. A spacing element (14) cooperates with the screw (10) to keep the washer (12) in a horizontal position above the bearing element (8). The end element (6) has a recess (16) which cooperates with the screw (10) so that the supporting element (2) can be moved into position by a substantially horizontal docking movement, whereby the recess (16) accommodates the screw (10) and the docking movement is completed when the screw (10) is fitted (18) in the recess (16).

12 Claims, 2 Drawing Sheets

(51) Int. Cl.
*F16B 43/02* (2006.01)
*B62D 21/09* (2006.01)
*F16B 5/02* (2006.01)

(56) References Cited

U.S. PATENT DOCUMENTS

| | | | | |
|---|---|---|---|---|
| 1,373,546 | A | * | 4/1921 | Zucker ................ B60K 5/12 248/672 |
| 1,652,159 | A | * | 12/1927 | Baker ................ B60K 5/12 180/291 |
| 1,655,146 | A | * | 1/1928 | Hicks ................ B60K 5/12 180/291 |
| 1,679,990 | A | * | 8/1928 | Schjolin ............ B60K 5/12 180/291 |
| 1,828,452 | A | * | 10/1931 | Westling ........................ 267/165 |
| 3,204,514 | A | * | 9/1965 | Sauvet ............................ 411/385 |
| 3,430,901 | A | | 3/1969 | Cauvin |
| 4,562,898 | A | * | 1/1986 | Huang ............................ 180/292 |
| 5,251,865 | A | * | 10/1993 | Kelly ............................. 248/634 |
| 5,303,798 | A | * | 4/1994 | Nakamura et al. .............. 180/292 |
| 5,305,847 | A | * | 4/1994 | Mefford ......................... 180/292 |
| 5,454,453 | A | * | 10/1995 | Meyer et al. ................... 180/377 |
| 5,862,877 | A | * | 1/1999 | Horton ..................... B60G 7/02 180/312 |
| 6,029,765 | A | * | 2/2000 | Chou et al. .................... 180/292 |
| 6,415,884 | B1 | * | 7/2002 | Hawener .............. B60K 5/1216 180/291 |
| 6,431,602 | B1 | * | 8/2002 | Ralko ..................... B60K 5/12 280/781 |
| 8,069,944 | B2 | * | 12/2011 | Fell ............................... 180/299 |
| 2004/0175252 | A1 | * | 9/2004 | Kurczynski .................... 411/120 |
| 2015/0192158 | A1 | * | 7/2015 | Chen ........................ G06F 1/16 403/14 |

FOREIGN PATENT DOCUMENTS

FR    2 878 494 A1    6/2006
RU    2362704 C2    7/2009

OTHER PUBLICATIONS

Russian Federation Search Report, dated Nov. 10, 2015, issued in corresponding Russian Patent Application No. RU2014144260/11(071404). Total pp. 3 pages.

* cited by examiner

FITTING ARRANGEMENT FOR FITTING A DRIVE PACKAGE FOR A VEHICLE

CROSS-REFERENCE TO RELATED APPLICATIONS

The present application is a 35 U.S.C. §§371 National Phase conversion of PCT/SE2013/050320, filed Mar. 22, 2013, which claims priority of Swedish Patent Application No. 1250329-8, filed Apr. 2, 2012, the contents of which are incorporated by reference herein. The PCT International Application was published in the English language.

FIELD OF THE INVENTION

The present invention relates to a fitting arrangement intended to be used when fitting a drive package for a vehicle, preferably a freight vehicle.

BACKGROUND TO THE INVENTION

Drive package in this context means a unit consisting of the engine and the gearbox and intended for mounting on the chassis frame of the vehicle. Fitting it is preceded by the fastening of one or more supporting elements, e.g. in the form of a carrier beam, on the upper side at one end of the drive package, preferably the end where the gearbox is situated. The other portion of the drive package, the end with the engine, is then provided with supports on the lower side. Fitting the drive package is then effected by its being docked in place, which involves its being moved into position so that the supporting elements and the supports rest on vibration-insulating parts, "insulators", on the chassis frame.

With the technique at present used, the fitting operation often takes a long time, since the drive package cannot be fully lowered, and the lifting yoke which holds the drive package during the fitting operation cannot be taken off, before the screws which have thereafter secure the supporting elements to the insulators are inserted, because the insulators give way somewhat under the weight of the drive package when it is being lowered. Another difficulty is that there is no guidance to align the drive package so that holes for the screws on the insulator match with those in the supporting element, i.e. the holes in the supporting element for the screws have to exactly correspond to the holes in the insulators for it to be possible for the screws to be screwed in.

The object of the present invention is to propose an arrangement which facilitates docking of a drive package to a chassis when fitting the drive package.

SUMMARY OF THE INVENTION

The above object is achieved with the invention herein.

Preferred embodiments are defined by the dependent claims.

According to the invention, the drive package with at least one supporting element, preferably in the form of the end portions of a carrier beam (the gearbox beam), is pushed into position between a washer, preferably with a bent-up front edge, and the insulator. This is facilitated by the supporting element being provided with one or more slitlike recesses at the rear edge instead of holes.

The washers which guide the supporting element to correct height and at the same time prevent the insulators from giving way are kept at correct height by spacing elements, preferably in the form of thin tubes or sleeves which thereafter easily become deformed (with consequently no loss of clamping force) during tightening of the screws at full torque. The object of the washers is thus not only to guide the supporting element in at a correct height but also to prevent the insulators from giving way.

Applying the present invention makes it possible for the docking of the drive package to be effected more flexibly, more safely and more quickly, saving costs in that more drive packages can be fitted and the lifting devices which lift the drive package into position can be utilised more efficiently.

DETAILED DESCRIPTION OF PREFERRED EMBODIMENTS OF THE INVENTION

The present invention will now be described with reference to the attached drawings. The same reference notations have been used throughout the drawings for items which have the same or similar functions.

Figure 7:
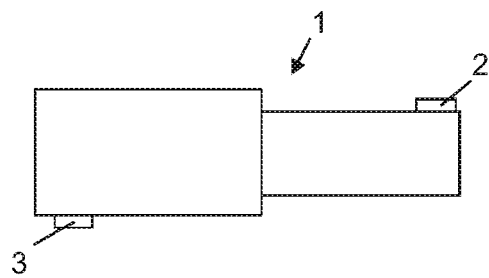
FIG. 7 is a schematic sideview of a drive package fitted with at least one supporting element according to the present invention.

The invention thus relates to a fitting arrangement for use when fitting a drive package 1 for a vehicle. FIG. 7 depicts schematically a drive package 1 adapted to bearing upon the frame via supporting elements 2, 3.

Figure 2:
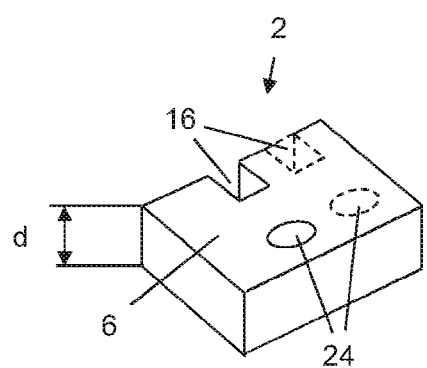
FIG. 2 is a perspective view illustrating another embodiment of the present invention.

With reference to FIG. 2, the fitting arrangement comprises a supporting element 2 adapted to being mounted on the drive package 1 and thereafter to being docked to the vehicle's frame 4. The supporting element is mounted on the drive package via, for example, angled fastening devices (not depicted in the drawings). The supporting element comprises an end element 6, with a height d, intended to cooperate with the vehicle's frame 4 in order thereby to support the drive package, and this end element is intended to abut upon a cooperating bearing element 8 which is itself dampingly suspended relative to the frame 4. The fitting arrangement further comprises at least one screw 10, see FIGS. 6a-6c and 8, adapted, by cooperation with said end element 6, to fix the supporting element 2 to the vehicle's frame 4 via said bearing element 8, and at least one washer 12 (see FIGS. 3, 4, 6a-6c and 8) intended to cooperate with the screw 10 in order to fix the supporting element 2 to the frame 4 via the washer 12.

Figure 6A:
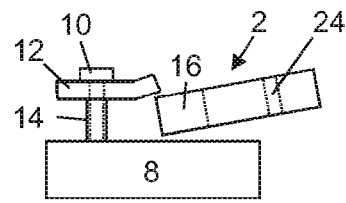
FIGS. 6a-6c are schematic sideviews of a fitting arrangement according to the invention during a docking movement.
Figure 6B:
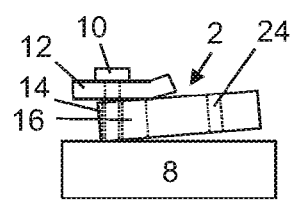
Figure 6C:
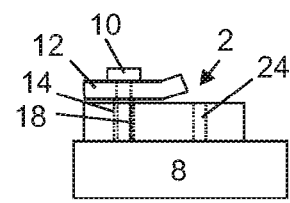

The fitting arrangement comprises also at least one spacing element 14 (see FIGS. 5 and 6a-6c) which has the height h, where h>d, and which in cooperation with the screw 10 is adapted to keeping the washer 12 in a horizontal position above the bearing element 8 to make it possible to fit the supporting element 2 between the washer 12 and the bearing element 8. The fitting arrangement is then in a docking state (see FIG. 6a). The end element 6 is provided with at least one recess 16 intended to cooperate with the screw 10 in such a way that the supporting element can be moved into position by a substantially horizontal docking movement whereby the recess 16 accommodates the screw and said docking movement is completed when the screw is in a fitted state 18 in the recess. FIGS. 6a-6c illustrate the docking movement.

In one embodiment the fitting arrangement is provided with two supporting elements 2 which may be separate units adapted to being mounted on the drive unit before the docking movement takes place.

Figure 1:
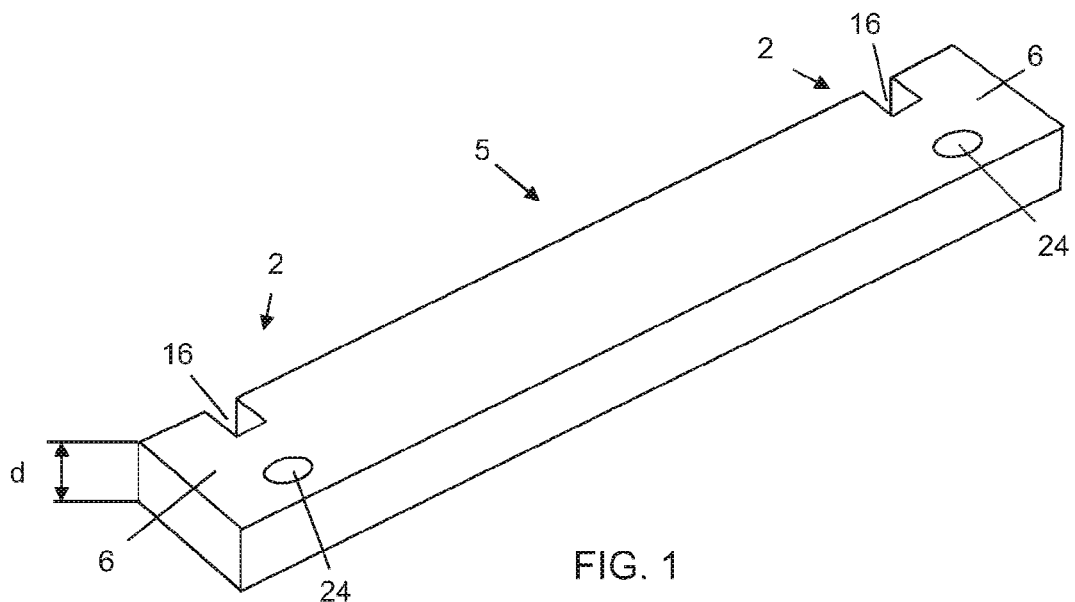
FIG. 1 is a perspective view illustrating an embodiment of the present invention.

In a further embodiment of the fitting arrangement the two supporting elements 2 take the form of end portions of a carrier beam 5. This is illustrated by FIG. 1 which is a schematic perspective view of a carrier beam.

The embodiment in which the supporting elements 2 take the form of the end portions of a carrier beam will now be described in detail. It should be noted that relevant parts of the description set out below are also applicable to the embodiment of the fitting arrangement described above. This applies particularly to the configuration of the washer and the spacing element.

Figure 8:
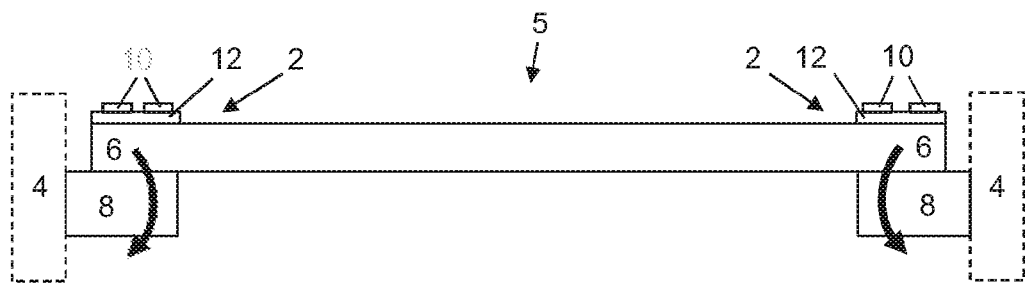
FIG. 8 is a schematic perspective sideview of a carrier beam fitted to a frame on a vehicle, with the end portions of the beam serving as the supporting elements according to an embodiment of the present invention.

In this embodiment, the invention relates to a fitting arrangement for use when fitting a drive package 1 (see FIG. 7) for a vehicle, which fitting arrangement comprises a carrier beam 5 with end portions comprising two supporting elements 2 (see particularly FIG. 1) adapted to being mounted on the drive package and thereafter to being docked to the vehicle's frame 4 (see FIG. 8). The carrier beam 5 is of elongate shape and comprises two end elements 6, with a height d, intended to cooperate with the vehicle's frame in order to support the drive package, and during the fitting operation the longitudinal direction of the carrier beam is substantially at right angles to the longitudinal direction of the vehicle. FIG. 8 shows the carrier beam 5 fitted to the frame 4. To illustrate the invention more clearly, the drive package does not appear in this drawing.

Each of the two end elements 6 of the supporting elements 2 is intended to abut upon a cooperating bearing element 8 (insulator) which is dampingly suspended relative to the frame 4, as depicted in FIG. 8. The bearing elements 8, the insulators, are adapted to being fitted to the vehicle's frame in appropriate ways. How they are fitted is not important for understanding the present invention and is therefore not described in more detail here.

The fitting arrangement comprises at least two screws 10 adapted to fix the supporting elements 2 to the vehicle's frame 4 via the two bearing elements 8, by at least one screw 10 cooperating with each of said end elements 6. The screws 10 appear in FIGS. 6a-6c and 8.

Figure 3:
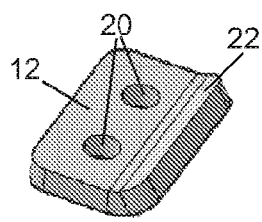
FIG. 3 is a perspective view of a washer according to a preferred embodiment of the present invention.
Figure 4:
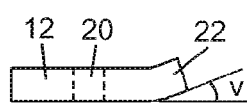
FIG. 4 is a cross-sectional view of a washer according to the present invention.
Figure 5:
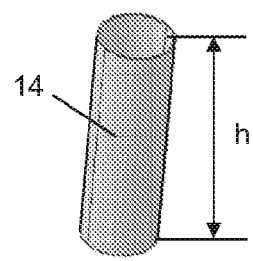
FIG. 5 is a perspective depiction of a spacing element according to a preferred embodiment of the present invention.

With reference to FIGS. 3 and 4, the fitting arrangement further comprises in this embodiment two washers 12 adapted to cooperating with the screws 10 in such a way that each washer cooperates with at least one screw so that, when the carrier beam 5 with the drive package has been fitted, the screws are adapted to fixing the carrier beam to the frame via said washers 12.

According to the invention, the fitting arrangement comprises at least two spacing elements 14 (depicted in FIG. 5) which each have the height h, where h>d, i.e. the height of the spacing element is greater than the height d of the supporting element. The supporting element has a typical height d of the order of 50 mm. The spacing element then has a height h which is a few millimeters, e.g. 2 mm, greater. In percentage terms, the height of the spacing element is about 2 to 5% greater than the height of the supporting element.

The spacing element is adapted to cooperating with said screw 10 by keeping the washer 12 in a horizontal position above the bearing element 8 to make it possible to fit the carrier beam 5 between the washer 2 and the bearing element 8. The fitting arrangement is then in a docking state, i.e. a state in which docking can take place.

Each of the two end elements 6 is further provided with at least one recess 16, and these recesses are intended to cooperate with said at least two screws 10 in such a way that the supporting elements 2 can be moved into position by a substantially horizontal docking movement whereby the respective recesses 16 accommodate the respective screws 10 and said docking movement is completed when the respective screws are in a fitted state 18 in the respective recesses.

The docking movement is illustrated schematically by FIGS. 6a-6c. In FIG. 6a the arrangement is in the docking state and docking has begun, i.e. the supporting element 2 (with the drive package) is about to be moved into position under the washer 12. In FIG. 6b the washer has helped to guide the supporting element so that the screws 10 are accommodated by the recesses 16, and in FIG. 6c the supporting element is in the fitted state 18 which means that the screw is at the bottom of the recess. In this situation the screws 10 can then be tightened and thereby fix the supporting element 2.

According to the present invention, the drive package with the supporting elements is therefore pushed into position between the washers, which preferably have bent-up front edges, and the bearing elements 8 (the insulators). This is facilitated by each supporting element having recesses at the rear edge instead of holes. The bearing elements 8 are thus prevented from giving way when the drive package is being lowered, as schematically illustrated by two arrows in FIG. 8. If the insulators did give way downwards, this would make it difficult to insert the screws.

The lifting yoke for the drive package (engine and gearbox) may also be released immediately without the screws being tightened, since the drive package is kept in position and "centered" by the screws already inserted.

FIG. 6a depicts one of the bearing elements 8 and how it is prepared for docking of the drive package, i.e. it shows the arrangement in the docking state. This combination helps to save a great deal of time when installing the engine in the chassis. Nor is there any need for prising and straining to align the respective holes in the beam and the insulators.

To enable them to accommodate the screws 10, the recesses 16 have a width which is greater than the diameter of the screws. Each recess preferably has a U-shaped configuration in a horizontal plane, as depicted in FIG. 1. The position for the fitted state 18 is at the bottom of the recess 16 (see FIG. 6c), and when the screws are in the fitted state they are tightened to fix the supporting element 2 via the washer 12.

The washer 12 has in one embodiment a substantially rectangular shape and is provided with at least one hole 20, preferably two holes, as particularly depicted in FIG. 3. In a further embodiment, the portion 22 of the washer 12 which is intended to point in the direction from which the supporting element 2 is fitted is bent somewhat upwards to facilitate the docking by guiding the beam into position. The portion or edge 22 is bent up in such a way as to form an angle v within the range of 10-30 degrees relative to a top surface of the washer 12, as illustrated in FIG. 4.

The washer has preferably a thickness within the range of 10-14 mm.

Within the scope of the inventive concept, the washer 12 may have other geometrical shapes. It may for example be circular and be then intended to be situated close to a screw. In such a configuration, more than one washer, e.g. two, may thus be used at each end of the carrier beam if it is provided with two recesses, as in FIG. 2.

In one embodiment the spacing element 14 is a tube (see FIG. 5) through which the screw 10 is inserted and which has an inside diameter somewhat larger than the screw's outside diameter. The tube also has an outside diameter larger than the diameter of a hole 20 in the washer 12 to be able to keep the washer in correct position. The tube is made of material which is stable in shape but readily deformable so that it becomes deformed when subjected to the forces exerted by the screw 10 when the supporting elements are being fixed. The tube is for example made of plastic, paper or thin board.

In another embodiment the spacing element is a block which is so arranged that the washer is kept in correct position and which is moved away by the supporting element during the docking movement. The supporting element is preferably provided with two recesses, as in FIG. 2. It is further suggested that holes, e.g. two holes 24 (see FIG. 2), be provided in the supporting element to allow for further screws to fasten it.

The present invention is not restricted to the preferred embodiments described above.

Sundry alternatives, modifications and equivalents may be used. The above embodiments are therefore not to be regarded as limiting the invention's protective scope which is defined by the attached claims.

The invention claimed is:

1. A fitting arrangement for fitting a drive package for a vehicle, the fitting arrangement comprising:
    a supporting element configured to be mounted on the drive package and thereafter to be docked to a frame of the vehicle, the supporting element comprising an end element, having a first height d and being further configured to cooperate with the frame of the vehicle to support the drive package;
    a bearing element dampingly suspended relative to the frame, the end element of the supporting element being configured to abut upon the bearing element;
    at least one screw cooperating with the end element for fixing the supporting element to the frame of the vehicle via the bearing element;
    at least one washer cooperating with the screw to fix the supporting element to the frame via the at least one washer; and
    at least one spacing element having a second height h, where h>d, the at least one spacing element cooperating with the screw for keeping the washer in a horizontal position above the spacing element making it possible to fit the supporting element between the washer and the bearing element, and, the fitting arrangement then being in a docking state;
    wherein the end element has at least one recess to cooperate with the at least one screw for enabling the supporting element to be moved into a position by a substantially horizontal docking movement whereby the at least one recess receives the at least one screw and the docking movement is completed when the screw is fitted into the recess.

2. The fitting arrangement according to claim 1, wherein the recess has a width which is greater than a diameter of the screw.

3. The fitting arrangement according to claim 1, wherein the recess has a U-shaped configuration in a horizontal plane.

4. The fitting arrangement according to claim 1, wherein the position for the screw in the fitted state is at a bottom of the recess, and the screw, in the fitted position, is tightened so that the supporting element is fixed via the washer.

5. The fitting arrangement according to claim 1, wherein the washer has a substantially rectangular shape and is provided with at least one hole.

6. The fitting arrangement according to claim 1, wherein the washer includes a portion thereof which extends in a direction from which the supporting element is fitted and the portion is bent up to facilitate docking by guiding the supporting element into position, the portion of the washer being bent up to form an angle within the range of 10-30 degrees relative to a top surface of the washer.

7. The fitting arrangement according to claim 1, wherein the spacing element comprises a tube through which the screw is inserted, the tube has an inside diameter larger than an outside diameter of the screw, and the tube has an outside diameter larger than the diameter of the hole in the washer to keep the washer in a correct position for its cooperation with the screw.

8. The fitting arrangement according to claim 7, wherein the tube is comprised of a material which is stable in shape but is deformable so that the tube becomes deformed when subjected to forces which the screw exerts when the supporting element is being fixed.

9. The fitting arrangement according to claim 7, wherein the tube is made of plastic, paper or thin board.

10. The fitting arrangement according to claim 1, wherein the supporting element has two of the recesses.

11. The fitting arrangement according to claim 1, comprising two of the supporting elements.

12. The fitting arrangement according to claim 11, further comprising a carrier beam and the two supporting elements take the form of end portions of the carrier beam.

* * * * *